US006088667A

United States Patent [19]

Murashima

[11] Patent Number: 6,088,667

[45] Date of Patent: Jul. 11, 2000

[54] LSP PREDICTION CODING UTILIZING A DETERMINED BEST PREDICTION MATRIX BASED UPON PAST FRAME INFORMATION

[75] Inventor: Atsushi Murashima, Tokyo, Japan

[73] Assignee: NEC Corporation, Japan

[21] Appl. No.: 09/023,642

[22] Filed: Feb. 13, 1998

[30] Foreign Application Priority Data

Feb. 13, 1997 [JP] Japan .................................... 9-044730

[51] Int. Cl.[7] ..................................................... G01L 19/04

[52] U.S. Cl. ........................... 704/219; 704/220; 704/230

[58] Field of Search .................................... 704/219, 220, 704/221, 222, 262

[56] References Cited

U.S. PATENT DOCUMENTS

| | | | |
|---|---|---|---|
| 5,233,660 | 8/1993 | Chen | 704/208 |
| 5,255,339 | 10/1993 | Fette et al. | 704/200 |
| 5,307,441 | 4/1994 | Zeng et al. . | |
| 5,414,796 | 5/1995 | Jacobs et al. | 704/221 |
| 5,487,128 | 1/1996 | Ozawa | 704/222 |
| 5,598,504 | 1/1997 | Miyano | 704/222 |
| 5,636,322 | 6/1997 | Ono | 704/222 |

(List continued on next page.)

FOREIGN PATENT DOCUMENTS

96/31873 10/1996 WIPO .

OTHER PUBLICATIONS

Ohmuro, Hitoshi et al., *Electronics and Communications in Japan, Part III—Fundamental Electronic Science*, "Vector Quantization of LSP Parametters Using Moving Average Interframe Prediction", vol. 77, No. 10, Part 03, Oct. 1994, pp. 12–25.

Chen, J., et al., *IEEE International Conference on Acoustics, Speech and Signal Processing*, "Covariance and Autocorrelation Methods for Vector Linear Prediction", Dallas, Texas, Apr. 6–9, 1987, vol. 3, pp. 1545–1548.

M.R. Schroeder, et al., "Code–Excited Linear Prediction (CELP): High–Quality speech At Very Low Bit Rates", Proc. ICASSP, 1985, pp. 937–940.

N. Sugamura, et al., "Speech Data Compression by LSP Speech Analysis–Synthesis Technique", Transactions of IECE of Japan, J64–A, No. 8, 1981, pp. 599–606.

H. Ohmuro, et al., "Vector Quantization of LSP Parameters Using Moving Average Interframe Prediction", Transactions of IECE of Japan, J77–A, No. 3, 1994, pp. 303–312.

Kleijn ("Continuous Represntations in LPC", 1991, IEEE).

Arya et al ("Fast Search algorithms with Applications to Split and Multi–Stage Vector Quantization of Speech LSP Parameters").

Tanaka et al ("Efficient Coding of LPC Parameters Using Adaptive Prefiltering and MSVQ with Partially Adaptive Codebook", 1993 IEEE).

Farvadin et al ("A Combined Quantization–Interpolation Scheme for Very Low Bit Rate Coding of Speech LSP Parameters", 1993, IEEE).

(List continued on next page.)

*Primary Examiner*—Krista Zele
*Assistant Examiner*—Michael N. Opsasnick
*Attorney, Agent, or Firm*—Ostrolenk, Faber, Gerb & Soffen, LLP

[57] ABSTRACT

An input vector is supplied from an input terminal 213. A first memory 213 accumulates a codevector from a quantizer. An adder 130 adds together the codevector and a Predicted vector from a predictor, and provides an output vector thus obtained to an output terminal 214. A second memory 214 accumulates the output vector. A prediction coefficient calculator calculates and provides a prediction coefficient matrix having the best evaluation value from the codevectors of a plurality of frames and the output vector. The predictor receives the codevectors of a plurality of selected past frames and the prediction coefficient matrix, and provides the predicted vector. A subtracter provides a difference vector between the input vector and the predicted vector. The quantizer obtains and provides the codevector by quantizing the difference vector.

18 Claims, 7 Drawing Sheets

U.S. PATENT DOCUMENTS

| | | | |
|---|---|---|---|
| 5,651,091 | 7/1997 | Chen | 704/223 |
| 5,664,055 | 9/1997 | Kroon | 704/223 |
| 5,745,871 | 4/1998 | Chen | 704/207 |
| 5,774,839 | 6/1998 | Shlomot | 704/222 |
| 5,781,883 | 7/1998 | Wynn | 704/226 |
| 5,787,389 | 7/1998 | Taumi et al. | 704/219 |
| 5,802,487 | 9/1998 | Tanaka | 704/230 |
| 5,832,180 | 11/1998 | Nomura | 704/223 |
| 5,924,062 | 7/1999 | Maung | 704/219 |

OTHER PUBLICATIONS

Sugamura et al ("Quantizer Design in LSP Speech Analysis and Synthesis", 1988 IEEE).

Merazka et al ("Vector Quantization of LSP Parameters by Split", 1998 IEEE).

Ohmura et al ("Coding of LSP Parameters Using Intervame Moving Average Prediction and Multi–Stage Vector Quantization", 1993, Speech coding for Telecommunications).

Gersho et al ("Vector Quantization and Signal Compression", 1992 Kluwer Academic Publishers, pp. 487–509).

Furui ("Digital Speech Processing, Synthesis, and Recognition", 1989 Marcel Dekker Inc., pp. 132–137, 168–173).

Kondoz ("Digital Speech", 1994 John Wiley & Sons Ltd., pp. 84–96).

LSP PREDICTION CODING UTILIZING A DETERMINED BEST PREDICTION MATRIX BASED UPON PAST FRAME INFORMATION

BACKGROUND OF THE INVENTION

The present invention relates to an LSP prediction coding method and apparatus and, more particularly, to a line spectrum pair (LSP) prediction coder used for speech coding and a decoding system.

Medium and low bit rate and high efficiency speech signal coding have been generally executed by separating a linear filter representing spectrum envelope components and an excitation signal based on linear prediction analysis of speech. A typical method in the art is CELP (Code Excited Linear Prediction). For the CELP, M. Schroeder, "Code Excited linear prediction: High Quality Speech at very low bit rate", Proc. ICASSP, pp. 937–940 1985 (hereinafter referred to as Literature 1) may be referred to.

In the CELP, a speech signal is divided into blocks (or frames) of a short time period (for instance 10 msec.) for frame-by-frame coding. In the coding of linear prediction coefficients representing spectrum envelope components, the linear prediction coefficients are converted into line spectrum pairs (LSP). For conversion of line spectrum coefficient into LSP, Sugamura et al, "Speech Data Compression by Line Spectrum Pair (LSP) Speech Analysis Synthesis Process", Transactions of IECE of Japan A, J64-A, NO. 8, pp. 599–606, 1981 (hereinafter referred to as Literature 2) may be referred to.

In the prior art LSP prediction coders, efficient coding utilizing LSP inter-frame correlation is realized by making linear prediction of input LSP (or input vector) of the present frame by using quantizer output (i.e., codevectors) of past frames and quantizing the difference between the predicted vector obtained by the prediction and the input vector. For LSP prediction coders, Ohmuro et al, "Vector Quantization of LSP Parameters using moving means inter-frame prediction", Transactions of IECE of Japan, J77-A, No. 3, pp. 303–312, 1994 (hereinafter referred to as Literature 3) may be referred to.

Prediction coder output vector q(n) of n-th frame is given as:

$$q(n) = c(n) + \bar{x}(n) \tag{1}$$

$$\bar{x}(n) = \sum_{i=1}^{M} A_i(n) c(n-i) \tag{2}$$

where c(n) is n-th frame codevector supplied from the quantizer, $x^{-}(n)$ is n-th frame predicted vector, $A_i(n)$ (i=1, . . . ,M) is the n-th frame prediction coefficient matrix, and M is the degree of prediction. The symbol "$^{-}$" in $x^{-}(n)$ is formally provided atop x in the formulas, but in the specification it is expressed as in $x^{-}$.

Denoting the degree of LSP by P, q(n), c(n) and $x^{-}(n)$ are P-th degree vectors, and $A_i(n)$ is a (P×P) matrix.

The prediction coefficient matrix $A_i(n)$ (i=1, . . . ,M) is obtained in advance in a manner as will be described hereinunder such that predicted error energy E given by following formula (3) is minimized.

$$E = \sum_{\{n; x(n)\in\Omega\}} \left\| x(n) - \sum_{i=1}^{M} A_i \cdot c(n-i) \right\|^2 \tag{3}$$

where x(n) is the n-th frame input vector, and $$\{n;\ x(n)\in\Omega\}$$

is aggregation of frames, in which the input vector x(n) is contained in aggregation Ω. The aggregation Ω is a vector aggregation obtained from a number of speech signals.

$A_i(n)$ (i=1, . . . ,M) is expressed as:

$$A_i = \begin{bmatrix} a_{i,11} & \cdots & a_{i,1P} \\ \vdots & & \vdots \\ a_{i,P1} & \cdots & a_{i,PP} \end{bmatrix} \tag{4}$$

and (P·P·M)-th degree vector λ defined as the following formula (5) by using elements $a_{i,jk}$ (i=1, . . . ,M, j, k=1, . . . ,P).

$$\lambda=[a_{1,11}, \ldots, a_{1,1P}, \ldots, a_{1,P1}, \ldots, a_{1,PP}, \ldots, a_{M,11}, \ldots, a_{M,1P}, \ldots, a_{M,P1}, \ldots, a_{M,PP}]^T \tag{5}$$

(P·P·M)×P matrix V(n) is defined by formula (6).

$$V(n)=[F_1(n)F_2(n) \ldots F_M(n)] \tag{6}$$

where (P·P)×P submatrix $F_i(n)$ (i=1, . . . ,M) is expressed by the following formula (7) by using elements $c_j(n)$ of the codevector c(n).

$$F_i(n) = \begin{bmatrix} c_0(n-i) & \cdots & c_{P-1}(n-i) & 0 & \cdots & 0 & 0 & \cdots & 0 \\ 0 & \cdots & 0 & c_0(n-i) & \cdots & c_{P-1}(n-i) & 0 & \cdots & 0 \\ 0 & \cdots & 0 & 0 & \cdots & 0 & 0 & \cdots & 0 \\ \vdots & & \vdots & \vdots & & \vdots\ \ddots & \vdots & & \vdots \\ 0 & \cdots & 0 & 0 & \cdots & 0 & c_0(n-i) & \cdots & c_{P-1}(n-i) \end{bmatrix} \tag{7}$$

The n-th frame prediction vector $x^{-}(n)$ is expressed by the following formula (8) by using the matrix V(n) and vector λ.

$$\bar{x}(n) = \sum_{i=1}^{M} A_{ic}(n-i) = V(n)\lambda \tag{8}$$

The predicted error energy E given by the formula (3) thus can be expressed by the following formula (9).

$$E = \sum_{\{n;x(n)\in\Omega\}} \|x(n) - V(n)\lambda\|^2$$

Since the partial differentiation of the predicted error energy E with respect to λ is zero, $$\partial E/\partial\lambda = 0$$

simultaneous linear equations given by the following formulas (10) can be obtained.

$$\left(\sum_{\{n;x(n)\in\Omega\}} V(n)^T V(n)\right)\lambda = \sum_{\{n;x(n)\in\Omega\}} V^T(n)x(n) \tag{10}$$

By solving the equations (10) for the vector λ, it is possible to obtain prediction coefficient matrix $A_i$ (i=1, . . . ,M) which minimizes the predicted error energy E given by the formula (3) from the relations of the above formulas (4) and (5).

It is also possible to obtain performance improvement by switching the prediction coefficient matrix $A_i$ (i=1, . . . ,M) in dependence on the character of the input speech signal.

A prior art LSP prediction coder will now be described with reference to FIG. 7. The Figure is a block diagram showing the prior art LSP prediction coder.

Referring to the FIG. 7, the n-th frame input vector x(n) is supplied from an input terminal 10. A memory 113 receives and accumulates codevector c(n) supplied from a quantizer 110.

A predictor 111 receives codevectors c(n−i), (i=1, . . . ,M) for past M frames and prediction coefficient matrix $A_i(n)$ (i=1, . . . ,M) which has been obtained in the manner as described above and stored in a prediction coefficient codebook 112, and calculates and provides predicted vector x (n) given by the formula (2).

A subtracter 120 receives the input vector x(n) and the predicted vector $x^-(n)$, and provides difference vector e(n)=x(n)−$x^-(n)$ representing the difference between the input vector x(n) and the predicted vector $x^-(n)$.

The quantizer 110 receives and quantizes difference vector e(n), and thus obtains and provides codevector c(n). The quantization may be performed by the vector quantization. For LSP vector quantization, K, Paliwal et al, "Efficient Vector Quantization of LSP Parameters at 24 Bits/Frame", IEEE transactions on Speech and Audio Processing, Vol. 1, No. 1, January 1993 (hereinafter referred to as Literature 4) may be referred to.

An adder 130 receives the codevector c(n) and the predicted vector $x^-(n)$, and obtains and provides output vector q(n) by adding together the codevector c(n) and the predicted vector $x^-(n)$ to an output terminal 11.

The above prior art prediction coder concerns moving mean prediction. Autoregressive prediction may be realized by substituting the following formula (11) for the formula (2).

$$\tilde{x}(n) = \sum_{i=1}^{M} A_i(n)q(n-i) \tag{11}$$

The LSP prediction coder as described above, has a problem that the prediction performance may be unsatisfactory depending on input LSP (i.e., input vector) supplied thereto.

This is because the prediction is performed for infinite kinds of input vectors that exist by using a prediction coefficient matrix obtained in advance.

SUMMARY OF THE INVENTION

The present invention was made in view of the above problem, and one of its object is to provide an LSP prediction coder capable of solving the aforementioned problem and ensures satisfactory prediction performance irrespective of the input vector.

The present invention is summarized with reference to numerals in the drawings which are to be described later.

In a first preferred embodiment of the present invention, the best prediction coefficient matrix is calculated in each frame. More specifically, the first preferred embodiment of the present invention comprises means (111 in FIG. 1) for calculating predicted vector from codevectors of a plurality of selected past frames and prediction coefficient matrix, first memory means (213 in FIG. 1) for accumulating codevectors obtained by quantizing the difference between the predicted vector and input vector, second memory means (214 in FIG. 1) for accumulating output vectors as the sum of the predicted vector and the codevector, and means (212 in FIG. 1) for calculating a predicted coefficient matrix having the best evaluation value from accumulated codevectors of a plurality of frames and accumulated output vectors of a plurality of frames.

In a second preferred embodiment of the present invention, the numbers of frames of codevectors and the output vectors used for calculation of the evaluation value in the first preferred embodiment of the present invention are switched in dependence on the character of input speech signal.

More specifically, the second preferred embodiment of the present invention comprises means (111 in FIG. 2) for calculating the predicted vector from codevectors of a plurality of selected past frames and prediction coefficient matrix, first memory means (213 in FIG. 2) for accumulating codevector obtained by quantizing the difference between the predicted vector and input vector, second memory means (214 in FIG. 2) for accumulating output vector as the sum of the predicted vector and the codevector, third memory means (313 in FIG. 2) for accumulating input speech signal, means (314 in FIG. 2) for calculating pitch predicted gain from the input speech signal, means (315 in FIG. 2) for determining a control signal from the pitch predicted gain, means (316 in FIG. 2) for determining an integration interval from the control signal, and means (312 in FIG. 2) for calculating prediction coefficient matrix having the best evaluation value from codevectors of a plurality of frames determined by the integration interval and output vectors of a plurality of frames determined by the integration interval.

In a third preferred embodiment of the present invention, present invention predicted coefficient matrix of the present frame is used without any prediction coefficient matrix calculation when the input speech signal is readily predictable in a plurality of continuous frames thereby reducing computational effort extent.

More specifically, the third preferred embodiment of the present invention comprises means (111 in FIG. 3) for calculating predicted vector from codevector of a plurality of selected past frames and the prediction coefficient matrix, first memory means (213 in FIG. 3) for accumulating codevectors obtained by quantizing the difference between the predicted vector and input vector, second memory means (214 in FIG. 3) for accumulating input vector as the sum of the predicted vector and the codevector, third memory means (313 in FIG. 3) for accumulating input speech signal, means (314 in FIG. 3) for calculating pitch predicted gain from the input speech signal, means (315 in FIG. 3) for determining control signal from the pitch predicted gain, means (413 in FIG. 3) for accumulating the control signal, means (412 in FIG. 3) for calculating, when the control signal does not take values less than a predetermined threshold value in a plurality of continuous frames, prediction coefficient matrix having the best evaluation value from accumulated codevectors of a plurality of frames and output vectors of a plurality of frames, means (415 in FIG. 3) for calculating, when the control signal does not take values less than a predetermined threshold value in a plurality of continuous frames, prediction coefficient matrix corresponding to the best evaluation value calculated from accumulated codevectors of a plurality of frames and output vectors of a plurality of frames, and means (415 in FIG. 3) for substituting, when the control signal does take values less than the threshold value in a plurality of continuous frames, prediction coefficient matrix of the immediately preceding frame for prediction coefficient matrix of the present frame, and selecting and providing, when the control signal does not take values less than the threshold value in a plurality of continuous frames, prediction coefficient matrix calculated in the present frame, and means (414 in FIG. 3) for holding the predetermined coefficient matrix.

In a fourth preferred embodiment of the present invention, the prediction coefficient matrix of the immediately preceding frame is used without making prediction coefficient matrix calculation when the input speech signal can be readily predicted in a plurality of continuous frames, thus reducing computational effort extent, and no prediction is performed in a frame in which it is difficult to predict the input speech signal.

More specifically, the fourth preferred embodiment of the present invention comprises means (111 in FIG. 4) for calculating predicted vector from codevectors of a plurality of selected past frames and prediction coefficient matrix, first memory means (213 in FIG. 4) for accumulating codevectors obtained by quantizing the difference between the predicted vector and input vector, second memory means (214 in FIG. 4) for accumulating input vector as the sum of the predicted vector and the codevector, third memory means (313 in FIG. 4) for accumulating input speech signal, means (314 in FIG. 4) for calculating pitch predicted gain from the input speech signal, means (315 in FIG. 4) for determining control signal from the pitch predicted gain, means (413 in FIG. 4) for accumulating the control signal, means (412 in FIG. 4) for calculating, when the control signal does not take values less than a predetermined threshold value in a plurality of continuous frames, prediction coefficient matrix corresponding to the best calculation value calculated from accumulated codevectors of a plurality of frames and output vectors of a plurality of frames, means (515 in FIG. 4) for substituting for and providing prediction coefficient matrix of the immediately preceding frame for prediction coefficient matrix of the present frame when the control signal does take values less than the first threshold value, selecting and providing prediction coefficient matrix calculated in the present frame when the control signal does not take values less than the first threshold value for a plurality of continuous frames and does take a value less than the second threshold value, and making the prediction coefficient matrix to be a zero matrix when the control signal does take a value less than the second threshold value, means (414 in FIG. 4) for holding prediction coefficient matrix, and quantizing means (510 in FIG. 4) for switching codevector tables in dependence on the magnitude relation between the value of the control signal and the second threshold value.

In a fifth preferred embodiment of the present invention, the numbers of frames of the codevectors and the output vectors used for calculation of the best evaluation value are switched in dependence on the character of the input speech signal.

More specifically, the fifth preferred embodiment of the present invention comprises means (316 in FIG. 5) for determining an interval from the control signal, and means (612 in FIG. 5) for calculating, when the control signal does not take values less than the threshold value for a plurality of continuous frames, a prediction coefficient matrix having the best evaluation value from codevectors of a plurality of frames determined by the integration interval and output vectors of a plurality of frames determined by the integration interval.

In a sixth preferred embodiment of the present invention, the numbers of frames of the codevectors and the output vectors used for calculation of the best evaluation value are switched in dependence on the character of the input speech signal.

More specifically, the sixth preferred embodiment of the present invention comprises means (316 in FIG. 6) for determining integration interval from the control signal, and means (612 in FIG. 6) for calculating, when the control signal does not take values less than threshold value in a plurality of continuous frames, prediction coefficient matrix having the best evaluation value from codevectors of a plurality of frames determined by the integration interval and output vectors of a plurality of frames determined by the integration interval.

In the preferred embodiments of the present invention as mentioned above, output vector in each frame is predicted from codevectors selected in a plurality of past frames on the basis of the above formula (2), and the resultant error is defined as predicted error. In each frame, prediction coefficient matrix of the present frame is calculated, which minimizes the average predicted error in a plurality of immediately preceding frames. The above vector prediction is performed by using the prediction coefficient matrix calculated in each frame.

This means that the prediction coefficient matrix is varied adaptively according to the input LSP (or input vector). It is thus possible to obtain satisfactory prediction performance for various input vectors.

In usual vector prediction, the input vector noted above is made to be a desired vector. According to the present invention, the above output vector is made to be a desired vector instead of the input vector under an assumption that the error between the output and input vectors is sufficiently small.

According to the present invention, as described above, the prediction coefficient matrix is obtained by using a decoded signal. This means that the prediction coefficient matrix calculation may be made on the receiving side in the same process as that on the transmitting side. Thus, no prediction coefficient matrix data need be transmitted.

According to the present invention, the processes of the LSP prediction coding method in the first to sixth preferred embodiments of the present invention may be realized by program execution on a data processor.

Other objects and features will be clarified from the following description with reference to attached drawings.

PREFERRED EMBODIMENTS OF THE INVENTION

The above preferred embodiments of the present invention will now be described in greater details in conjunction with embodiments of the present invention with reference to the accompanying drawings.

Figure 1:
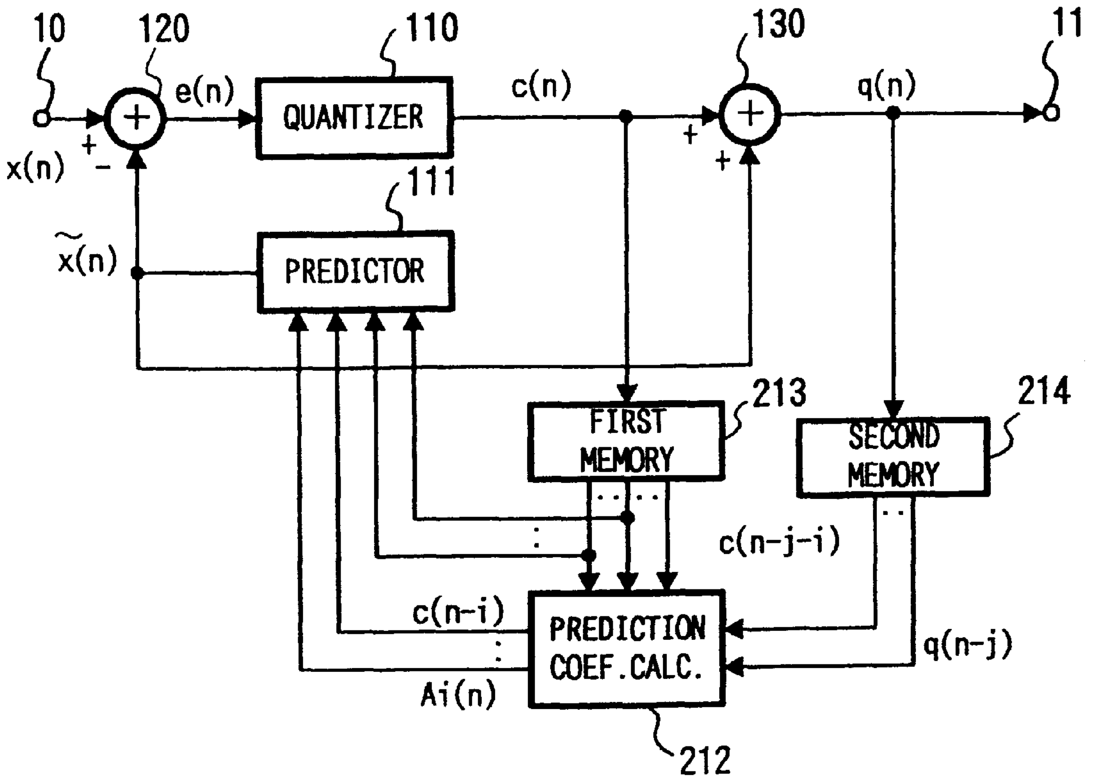
FIG. 1 is a block diagram showing a first embodiment of an LSP prediction coding method and apparatus in accordance with the present invention.

FIG. 1 is a block diagram showing a first embodiment of the present invention. Referring to the Figure, n-th frame input vector x(n) is supplied from an input terminal 10. First memory 213 receives and accumulates n-th frame codevector c(n) supplied from a quantizer 110. Adder 130 receives the codevector c(n) and n-th frame prediction vector $x^{-}(n)$ supplied from a predictor 111, and obtains and provides to an output terminal 11 output vector q(n) by adding together the codevector c(n) and the predicted vector $x^{-}(n)$.

A second memory 214 receives and accumulates the output vector q(n). A prediction coefficient calculator 212 receives codevectors c(n−j) (j=2, . . . ,N) of past (N+M−1) frames from the first memory 213 and also output vectors q(n−j) (j=1, . . . ,N) from the second memory 214 , and calculates and provides prediction coefficient matrix $A_i$(n) (i=1, . . . , M) which minimizes n-th frame prediction error energy E(n) given by the following formula (12).

$$E(n)=\sum_{j=1}^{N}\left\|q(n-j)-\sum_{i=1}^{M}A_i(n)\cdot c(n-j-i)\right\|^2 \tag{12}$$

The prediction coefficient matrix $A_i$(n) (i=1, . . . ,M) is expressed by the following formula (13).

$$A_i(n)=\begin{bmatrix} a_{i,11}(n) & \cdots & a_{i,1P}(n) \\ \vdots & & \vdots \\ a_{i,PJ}(n) & \cdots & a_{i,PP}(n) \end{bmatrix} \tag{13}$$

The (P·P·M)-th vector λ(n) is defined by the following formula (14) by using prediction coefficient matrix elements $a_{i,jk}$(n) (i=1, . . . ,M, j, k=1, . . . ,P).

$$\lambda(n)= \tag{14}$$

$$, \ldots, a_{1,PP}(n), \ldots, a_{M,11}(n), \ldots, a_{M,1P}(n), \ldots, a_{M,PJ}(n), \ldots, a_{M,PP}(n)]^T$$

(P·P·M)×P Matrix V(n) is defined by the formula (6), i.e., defined as:

$$V(n)=[F_1(n)F_2(n) \ldots F_M(n)].$$

(P·P)×P submatrix $F_i$(n) (i=1, . . . ,M) is expressed by the formula (7) by using elements $c_j$(n) (j=0, . . . ,P−1) of the codevector c(n), i.e., expressed by the following formula (13).

$$F_i(n)= \tag{14}$$

$$\begin{bmatrix} c_0(n-i) & \cdots & c_{P-1}(n-i) & 0 & \cdots & 0 & 0 & \cdots & 0 \\ 0 & \cdots & 0 & c_0(n-i) & \cdots & c_{P-1}(n-i) & 0 & \cdots & 0 \\ 0 & \cdots & 0 & 0 & \cdots & 0 & 0 & \cdots & 0 \\ \vdots & & \vdots & \vdots & & \vdots \ \ddots & \vdots & & \vdots \\ 0 & \cdots & 0 & 0 & \cdots & 0 & c_0(n-i) & \cdots & c_{P-1}(n-i) \end{bmatrix}$$

The n-th frame prediction vector $x^{-}(n)$ is expressed by the following formula (15) by using matrix (V(n) and vector λ(n).

$$\begin{aligned}\tilde{x}(n)&=\sum_{i=1}^{M}A_i(n)c(n-i)\\&=V(n)\lambda(n)\end{aligned} \tag{15}$$

The prediction error energy E(n) given by the formula (12) is thus expressed by the following formula (16).

$$\begin{aligned}&E(n)=\sum_{j=1}^{N}\|q(n-j)-V(n-j)\lambda(n)\|^2\\&\partial E(n)/\partial\lambda(n)=0\end{aligned} \tag{16}$$

Simultaneous linear equations of the following formulas (17) are thus obtained.

$$\left(\sum_{j=1}^{N} V(n-j)^T V(n-j)\right)\lambda(n) = \sum_{j=1}^{N} V^T(n-j)q(n-j) \tag{17}$$

By solving the equation (17) for the vector (n), prediction coefficient matrix $A_i(n)$ (i=1, . . . ,M) which minimizes the predicted error energy E(n) given by the formula (12) can be obtained on the basis of the relationship between the above formulas (13) and (14).

The predictor 111 receives codevectors c(n−1), (j=1, . . . ,M) of past M frames and also the prediction coefficient matrix $A_i(n)$ (i=1, . . . ,M), and calculates and supplies the predicted vector x⁻(n) given by the formula (2).

A subtracter 120 receives the input vector x(n) and the predicted vector x⁻(n), and supplies difference vector e(n)= x(n)−x⁻(n) representing the difference between the input vector x(n) and the predicted vector x⁻(n).

The quantizer 110 receives and quantizes the difference vector e(n), and obtains and provides codevector c(n).

This embodiment concerns moving mean prediction, but autoregressive prediction may be realized by substituting the formula (11) for the formula (2). In this case, the formula (12) is substituted by the following formula (18).

$$E(n) = \sum_{j=1}^{N} \left\| q(n-j) - \sum_{i=1}^{N} A_i(n)\cdot q(n-j-i) \right\|^2 \tag{18}$$

Figure 2:
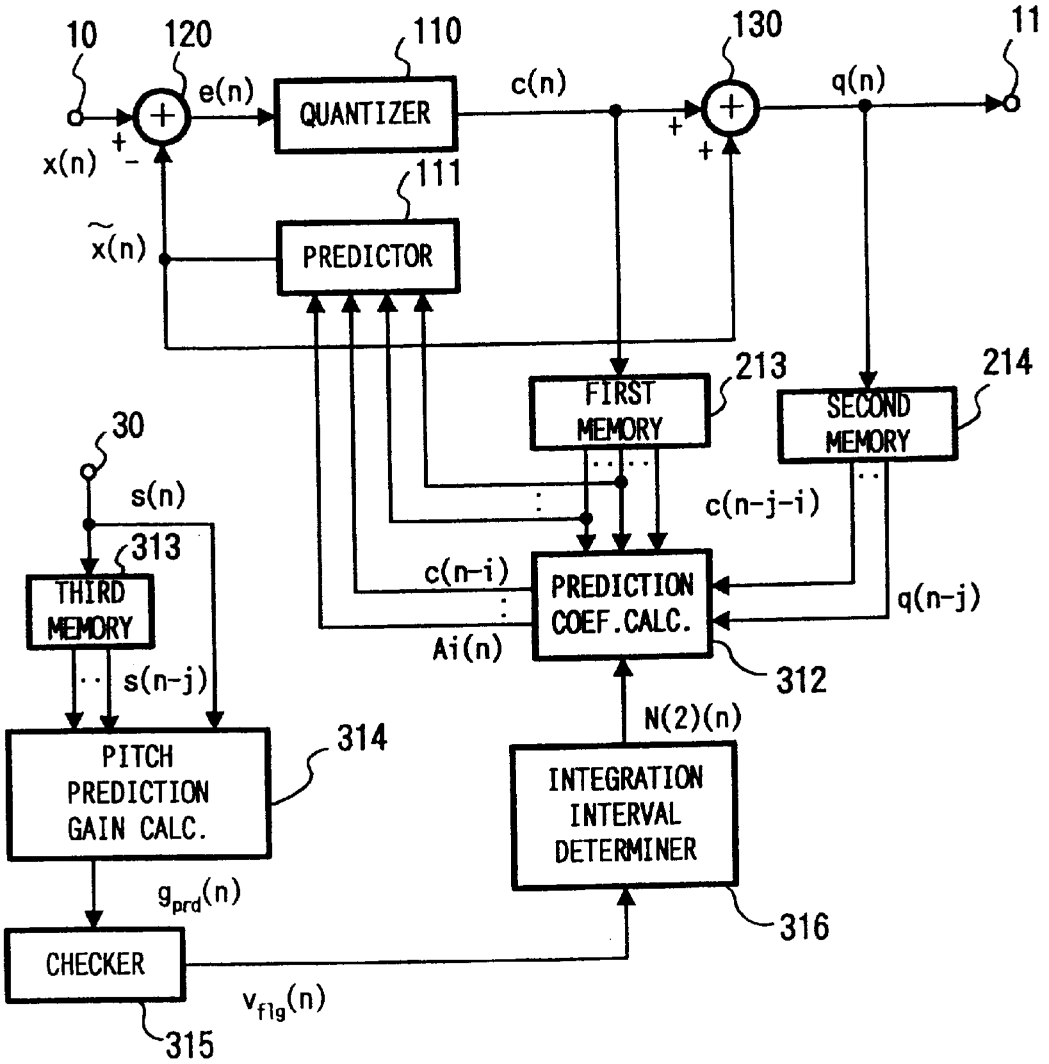
FIG. 2 is a block diagram showing a second embodiment of an LSP prediction coding method and apparatus in accordance with the present invention.

FIG. 2 is a block diagram showing a second embodiment of the present invention. Referring to the Figure, n-th frame input speech vector s(n) is supplied from an input terminal 30. A third memory 313 receives and accumulates the input speech vector s(n). Assuming that the frame length is constituted by L samples, the input speech vector s(n) is an L-th degree vector given by the following formula (19). In the formula (19), T represents transposing.

$$s(n)=[s_o(n), \ldots, s_{L-1}(n)]^T \tag{19}$$

A pitch predicted gain calculator 314 receives the n-th frame input speech vector s(n) and input speech vectors s(n−j) (j=1, . . . ,m+1) of past (m+1) frames, and calculates and provides n-th frame pitch predicted gain $g_{prd}(n)$ given by the following formula (20).

$$g_{prd}(n) = \max\left\{ \frac{\sum_{i=0}^{L-1} s_i(n)s'_{i-d}(n)}{\sum_{i=0}^{L-1} s'_{i-d}(n)^2} \right\}, \quad d = L_{d\min}, \cdots, Ld_{d\max} \cdots \tag{20}$$

where max {a} expresses selection of the maximum value of a, and $s'_{i-d}(n)$ is element of vector s'(n), which is given by the following formula (21).

$$\begin{aligned} s'(n) &= [s'_{-1}(n), \cdots, s'_{-mL-1}(n), s'_{-mL}(n), \cdots, \\ &\quad s'_{-(m-1)L-1}(n), \cdots]^T \\ &= [s_{L-(l-mL)}(n-(m+1)), \cdots, s_{L-1}(n-(m+1)), \\ &\quad s_0(n-m), \cdots, s_{L-1}(n-m), \cdots]^T, \\ l &= L_{d\min}, \cdots, L_{d\max}, \quad m = 0, 1, 2, \cdots \end{aligned} \tag{21}$$

A checker 315 receives the pitch predicted gain $g_{prd}(n)$, and determines and provides n-th frame control signal $v_{flg}(n)$ as in the following formula (22).

$$v_{flg}(n) = \begin{cases} 0 & g_{prd}(n) < V_{th,0} \\ 1 & V_{th,0} \le g_{prd}(n) < V_{th,1} \\ \vdots & \\ N_{th}-2 & V_{th,Nth-3} \le g_{prd}(n) < V_{th,Nth-2} \\ N_{th}-1 & V_{th,Nth-2} \le g_{prd}(n) \end{cases} \tag{22}$$

An integration interval determiner 316 receives the control signal $v_{flg}(n)$, and determines n-th frame integration interval $N^{(2)}(n)$ given by the following formula (23).

$$N^{(2)}(n) = \begin{cases} N_0 & v_{flg}(n) = 0 \\ \vdots & \\ N_{Nth-1} & v_{flg}(n) = N_{th}-1 \end{cases} \tag{23}$$

A prediction coefficient calculator 312 receives the integration interval $N^{(2)}(n)$, codevectors c(n−j) (j=2, . . . , $N^{(2)}(n)$) for past $N^{(2)}(n)$ frames from the first memory 213 and output vectors q(n−j) (J=1, . . . ,$N^{(2)}(n)$) for past $N^{(2)}(n)$ frames from the second memory 214, and calculates and provides prediction coefficient matrix $A_i(n)$ (i=1, . . . ,M) which minimizes n-th frame predicted error energy $E^{(2)}(n)$ given by the following formula (24).

$$E^{(2)}(n) = \sum_{j=1}^{N(2)(n)} \left\| q(n-j) - \sum_{i=1}^{M} A_i(n)\cdot c(n-j-i) \right\|^2 \tag{24}$$

The prediction coefficient matrix $A_i(n)$ (i=1, . . . ,M) can be obtained in a manner similar to that in the first embodiment. Input terminal 10, first memory 213, adder 130, second memory 214, predictor 111, subtracter 120 , quantizer 110 and output terminal 11 are like those in the first embodiment, and are not described.

This embodiment concerns moving mean prediction. Autoregressive prediction can be realized by substituting the formula (11) for the formula (2). In this case, the formula (24) is substituted by the formula (25).

$$E^{(2)}(n) = \sum_{j=1}^{N(2)(n)} \left\| q(n-j) - \sum_{i=1}^{M} A_i(n)\cdot q(n-j-i) \right\|^2 \tag{25}$$

Figure 3:
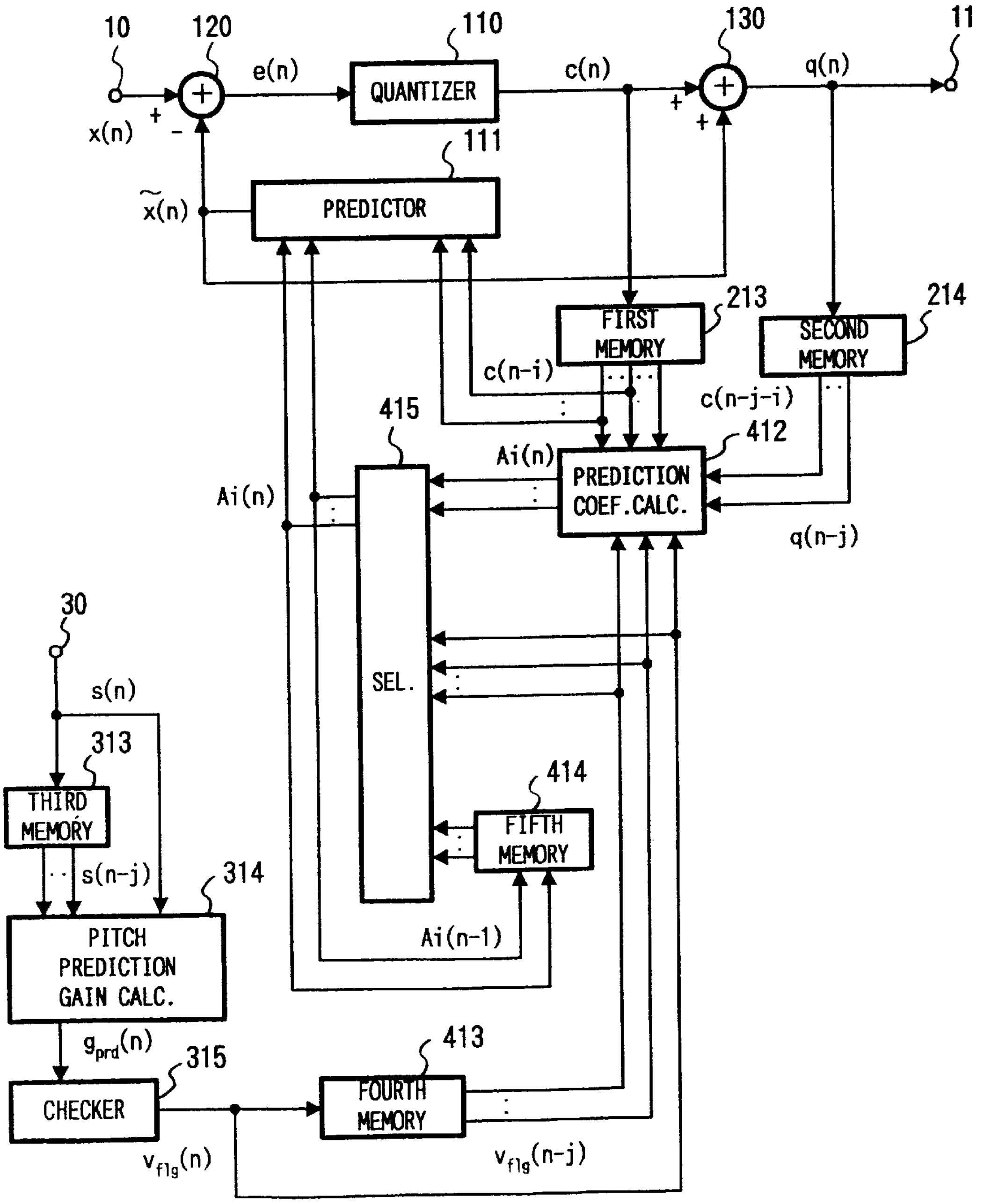
FIG. 3 is a block diagram showing a third embodiment of an LSP prediction coding method and apparatus in accordance with the present invention.

FIG. 3 is a block diagram showing a third embodiment of the present invention. In the Figure, elements like or equivalent to those in FIG. 2 are designated by like reference numerals and symbols. Mainly the difference of this embodiment from the embodiment shown in FIG. 2 will now be described.

Referring to FIG. 3, a fourth memory 413 receives and accumulates a control signal $v_{flg}(n)$. A prediction coefficient calculator 412 receives n-th frame control signal $v_{flg}(n)$ and control signals $v_{flg}(n-j)$ (j=1, . . . ,M) of past K frames. When the control signal $v_{flg}(n)$ does not satisfy the following formula (26).

$$(v_{flg}(n)\geqq N'_{th})\cap(v_{flg}(n-1)\geqq N'_{th}))\cap\ldots\cap(v_{flg}(n-K)\geqq N'_{th}) \quad (26)$$

the prediction coefficient calculator 412 receives codevectors c(n−j) (j=2, . . . , N+M) of past (N+M−1) frames from the first memory 213 and also output vectors q(n−j) (j=1, . . . ,N) of past N frames from the second memory 214, and calculates and provides prediction coefficient matrix $A_i(n)$ (i=1, . . . ,M) which minimizes the predicted error energy E(n) given by the formula (12). Expression A∩B means that both the conditional formulas are true.

The prediction coefficient matrix $A_i(n)$ (i=1, . . . ,M) can be obtained in a manner similar to that in the first embodiment.

A selector 415 receives n-th frame control signal $v_{flg}(n)$ and control signal $v_{flg}(n-j)$ (j=1, . . . ,K). When the control signal $v_{flg}(n)$ satisfies the formula (26), the selector 415 receives prediction coefficient matrix $A_i(n-i)$ (i=1, . . . ,M) selected in the preceding frame from a fifth memory 414, and provides the same as:

$$A_i(n)=A_i(n-1),\ (i=1,\ldots,M) \quad (27)$$

When the control signal $v_{flg}(n)$ does not satisfy the formula (26), the selector 415 receives and provides prediction coefficient matrix $A_i(n)$ (i=1, . . . ,M) from a prediction coefficient calculator 412.

The fifth memory 414 receives and holds prediction coefficient matrix $A_i(n)$ (i=1, . . . ,M) selected in n-th frame.

Input terminal 10, first memory 213, adder 130, second memory 214, predictor 111, subtracter 120, quantizer 110, output terminal 11, input terminal 30, third memory 313, pitch predicted gain calculator 314 and checker 315 are like those in the second embodiment in the construction and function, and are not described.

This embodiment concerns moving mean prediction. Autoregressive prediction can be obtained by substituting the formula (11) for the formula (2). In this case, the formula (12) is substituted by the formula (18).

Figure 4:
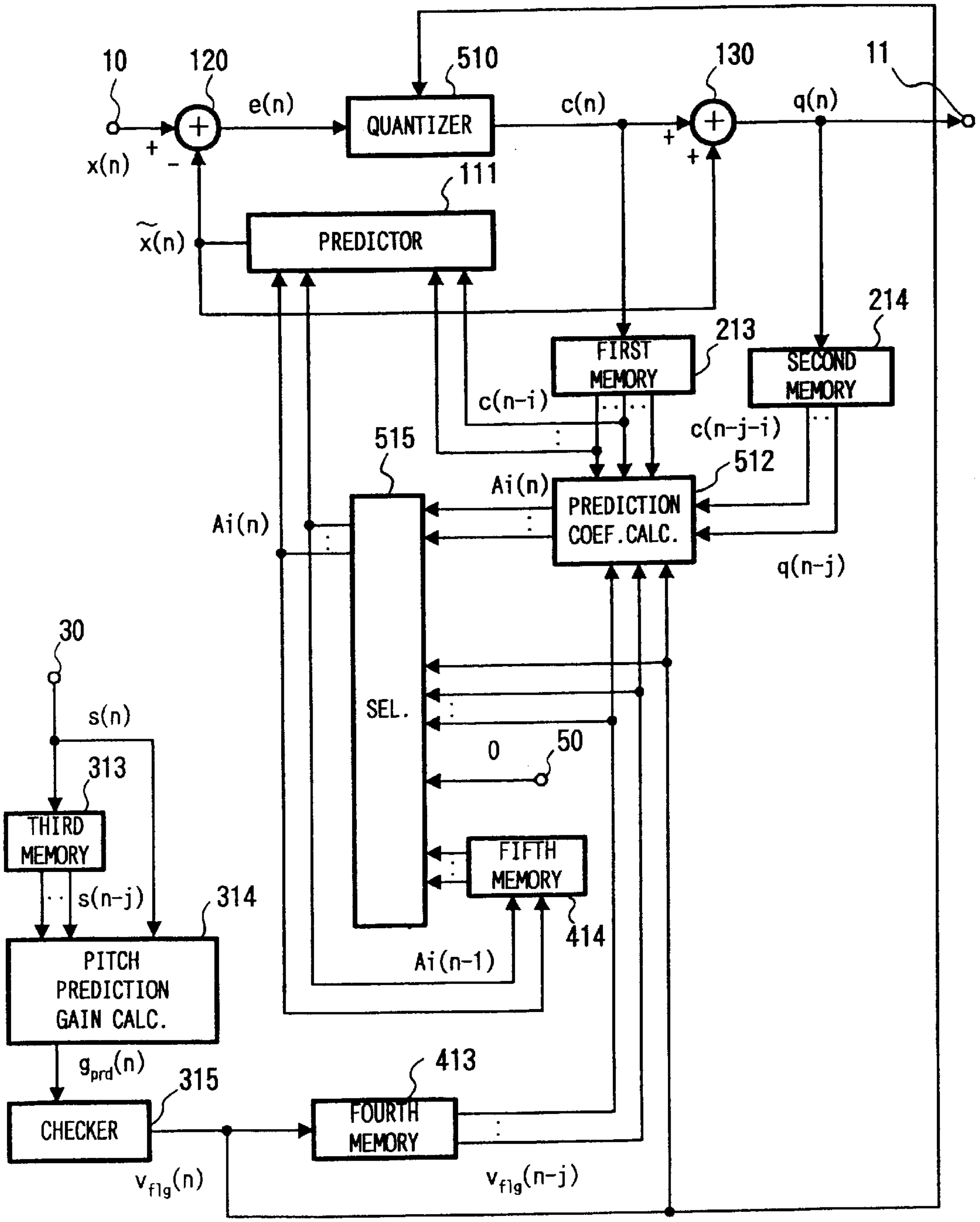
FIG. 4 is a block diagram showing a fourth embodiment of an LSP prediction coding method and apparatus in accordance with the present invention.

FIG. 4 is a block diagram showing a fourth embodiment of the present invention. Referring to the Figure, a prediction coefficient calculator 512 receives n-th frame control signal $v_{flg}(n)$ and control signals $v_{flg}(n-j)$ (j=1, . . . ,M) for past K frames. When the control signal $v_{flg}(n)$ satisfies neither the formula (26) nor the following formula (28), $$v_{flg}(n)<Nth''(Nth') \quad (28)$$

the prediction coefficient calculator 612 receives code vectors c(n−j) (j=2, . . . ,N+M) for past (N+M−1) frames from the first memory 213 and also output vectors q(n−j) (j=1, . . . ,N) for past N frames from the second memory 214, and calculates and provides prediction coefficient matrix $A_i(n)$ (i=1, . . . ,M) which minimizes the predicted error energy E(n) given by the formula (12).

The prediction coefficient formula $A_i(n)$ (i=1, . . . ,M) can be obtained in a manner similar to that in the first embodiment.

A selector 515 receives the n-th frame control signal vflg(n) and control signals $v_{flg}(n-j)$ (j=1, . . . ,K) for past K frames. When the control signal $v_{flg}(n)$ satisfies the formula (26), the selector 515 receives and provides prediction coefficient matrix $A_i(n)$ (i=1, . . . ,M) given as $$A_i(n)=A_i(n-1),\ (i=1,\ldots,M) \quad (29)$$

which has been selected in the fifth memory 414 in the preceding frame. When the control signal $v_{flg}$ satisfies neither of the formulas (26) and (28), the selector 515 receives and provides the prediction coefficient matrix $A_i(n)$ (i=1, . . . , M) from the prediction coefficient calculator 512. When the control signal $v_{flg}(n)$ does not satisfy the formula (26) but satisfies the formula (28), the selector 515 receives zero matrix 0 via a terminal 50, and from this zero matrix it provides $$A_i(n)=(i=1,\ldots,M) \quad (30).$$

The quantizer 510 receives the difference vector e(n) and the control signal $v_{flg}(n)$, and quantizes the difference vector e(n) by switching the table (or codebook) of the codevector c(n) in dependence on whether the control signal $v_{flg}(n)$ does satisfy the formula (28) (i.e., when making no prediction) or does not (i.e., when making a prediction).

Input terminal 10, first memory 213, adder 130, second memory 214, predictor 111, subtracter 120, output terminal 11, input terminal 30, third memory 313, pitch predicted gain calculator 314, checker 315, and fourth and fifth memories 413 and 414, are like those in the third embodiment, and are not described.

This embodiment concerns moving mean prediction. Autoregressive prediction can be realized by substituting the formula (11) for the formula (2). In this case, the formula (12) is substituted for by the formula (18).

Figure 5:
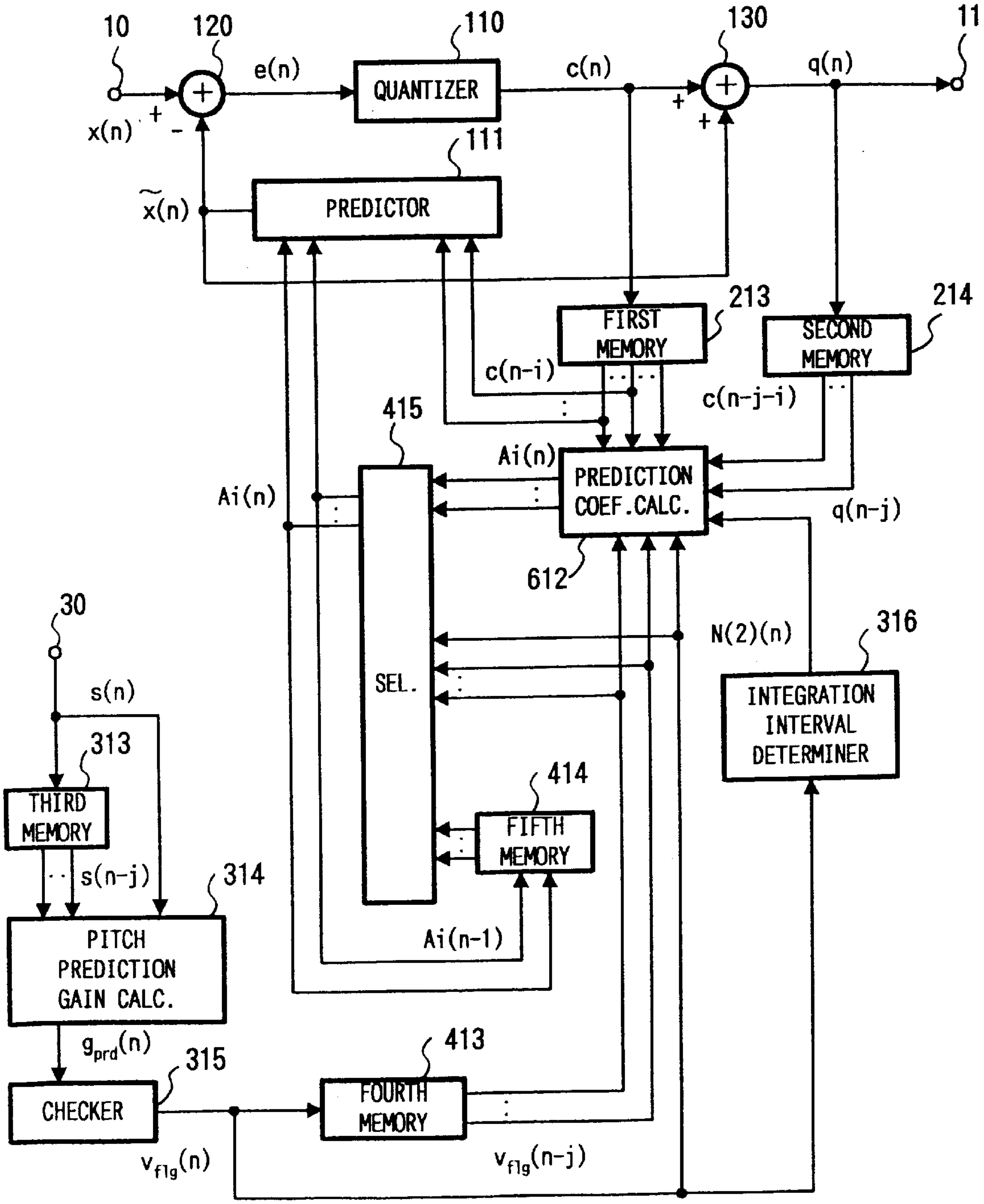
FIG. 5 is a block diagram showing a fifth embodiment of an LSP prediction coding method and apparatus in accordance with the present invention.

FIG. 5 is a block diagram showing a fifth embodiment of the present invention. Referring to the Figure, a prediction coefficient calculator 612 receives integration interval $N^{(2)}(n)$ from the integration interval determiner 316, n-th frame control signal $v_{flg}(n)$ and control signals $v_{flg}(n-j)$ (j=1, . . . ,K) for past K frames. When the control signal $v_{flg}(n)$ does not satisfy the formula (26), the prediction coefficient calculator 612 receives codevectors c(n−j) (j=2, . . . ,$N^{(2)}(n)$+M) for past ($N^{(2)}(n)$+M−1) frames from the first memory 213 and also output vectors q(n−j) (j=1, . . . ,$N^{(2)}(n)$) for past $N^{(2)}(n)$ frames, and calculates and provides prediction coefficient matrix $A_i(n)$ (i=1, . . . ,M) which minimizes the predicted error energy $E^{(2)}(n)$ given by the formula (24). The predicted error matrix $A_i(n)$ (i=1, . . . ,M) can be obtained in a manner similar to that in the first embodiment.

Input terminal 10, first memory 213, adder 130, second memory 214, predictor 111, subtracter 120, quantizer 110, output terminal 11, input terminal 30, third memory 313, pitch predicted gain calculator 314, checker 315, fourth memory 413, selector 415, fifth memory 414 and integration interval determiner 316 are like those in the third embodiment, and are not described.

The above embodiment concern moving mean prediction. Autoregressive prediction can be realized by substituting the formula (2) for the formula (11). In this case, the formula (24) is substituted for by the formula (25).

Figure 6:
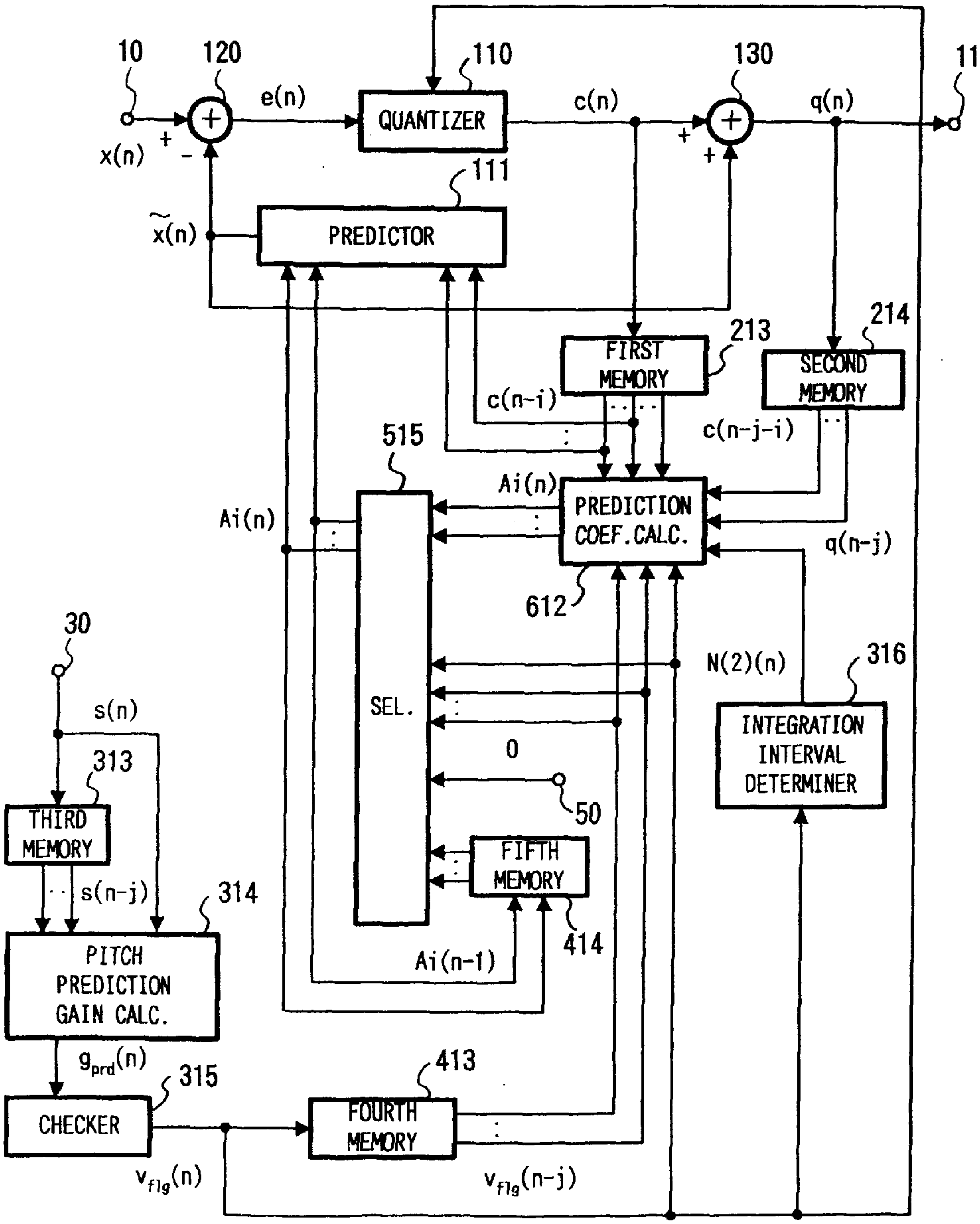
FIG. 6 is a block diagram showing a sixth embodiment of an LSP prediction coding method and apparatus in accordance with the present invention.
Figure 7:
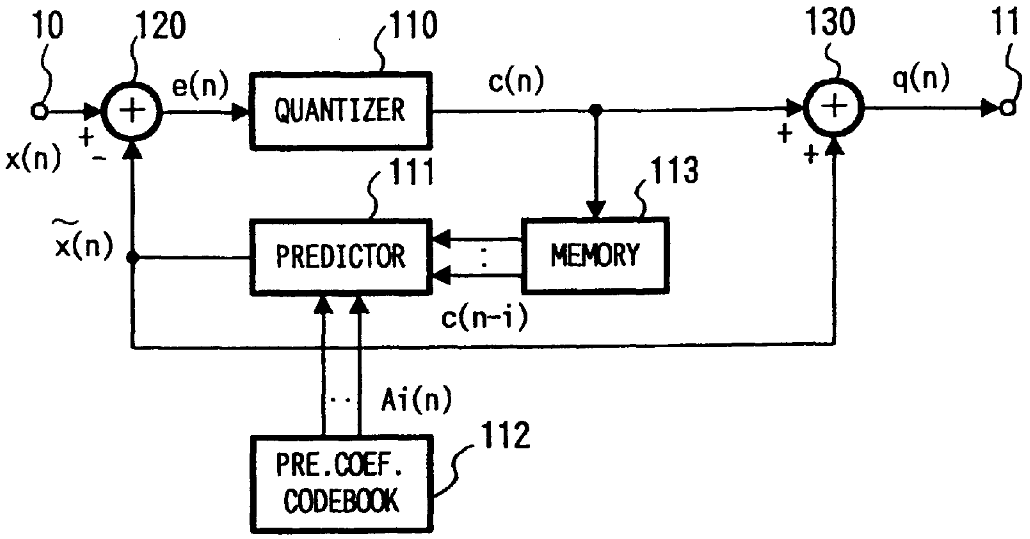
FIG. 7 PRIOR ART
FIG. 7 is a block diagram showing a prior art LSP prediction coder.

FIG. 6 is a block diagram showing a sixth embodiment of the present invention. Referring to FIG. 6, this embodiment is obtained by adding integration interval determiner 316 to the fourth embodiment shown in FIG. 4. Input terminal 10, first memory 213, adder 130, second memory 214, predictor 111, subtracter 120, quantizer 510, output terminal 11, input terminal 30, third memory 313, pitch predicted gain calculator 314, checker 315, fourth memory 413, selector 515 and fifth memory 414 are like those in the fourth embodiment, and integration interval determiner 316 and prediction coefficient calculator 612 are like those in the fifth embodiment.

This embodiment concerns moving mean prediction. Autoregressive prediction can be realized by substituting the formula (2) for the formula (11). In this case, the formula (24) is substituted for by the formula (25).

As has been described in the foregoing, according to the present invention the following advantages are obtainable.

A first advantage of the present invention is that satisfactory prediction performance can be obtained irrespective of the input vector supplied to the prediction coder due to the adaptive variation of prediction coefficient matrix according to the input vector.

A second advantage of the present invention is that no prediction coefficient matrix data need be transmitted. This is because the prediction coefficient matrix can be calculated on the receiving side by the same process as in the transmitting side.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated codevectors and from the prediction coefficient matrix of the present frame, the prediction vector being used to predict the input vector of the present frame;

calculating the codevector of the present frame by quantizing the difference between the prediction vector and the input vector of the present frame; and calculating an output vector of the present frame by adding together the prediction vector and the codevector of the present frame.

2. A method for coding, an input vector of a present frame using LSP prediction coding the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated codevectors and from the calculated prediction coefficient matrix of the present frame, the prediction vector being used to predict the input vector of the present frame;

calculating the codevector of the present frame by quantizing the difference between the prediction vector and the input vector of the present frame;

calculating an output vector of the present frame by adding together the prediction vector and the codevector of the present frame;

accumulating input speech signals for frames previous to the present frame to produce accumulated input speech signals;

receiving an input speech signal of the present frame;

calculating a pitch predicted gain for the present frame from the input speech signal of the present frame and from the accumulated input speech signals; and determining a control signal for the present frame from the pitch predicted gain of the present frame.

3. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated codevectors and from the prediction coefficient matrix of the present frame, the prediction vector being used to predict the input vector of the present frame;

calculating the codevector of the present frame by quantizing the difference between the prediction vector and the input vector of the present frame;

calculating an output vector of the present frame by adding together the prediction vector and the codevector of the present frame;

accumulating input speech signals from frames previous to the present frame to produce accumulated input speech signals;

receiving an input speech signal of the present frame; calculating a pitch predicted gain for the present frame from the input speech signal of the present frame and from the accumulated input speech signals;

accumulating control signals for frames previous to the present frame to produce accumulated control signals, the control signals being determined from the pitch predicted gain of a respective frame, each control signal having a control signal value;

determining a control signal for the present frame from the pitch predicted gain of the present frame and the accumulated control signals;

substituting a prediction coefficient matrix of the frame immediately preceding the present frame for the prediction coefficient matrix of the present frame when all of the control signal values of the accumulated control signals, are not less than a predetermined threshold value.

4. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated codevectors and from the prediction coefficient matrix of the present frame;

calculating the codevector of the present frame by quantizing the difference between the prediction vector and the input vector of the present frame;

calculating an output vector of the present frame by adding together the prediction vector and the codevector of the present frame, the prediction vector being used to predict an input vector of the present frame;

accumulating input speech signals for frames previous to the present frame to produce accumulated input speech signals;

receiving an input speech signal of the present frame;

calculating a pitch predicted gain for the present frame from the input speech signal of the present frame and the accumulated input speech signals;

accumulating control signals for frames previous to the present frame to produce accumulated control signals, the control signals being determined from the pitch predicted gain of a respective frame;

determining a control signal for the present frame from the pitch predicted gain of the present frame and the accumulated control signals;

each control signal having a control signal value;

substituting a prediction coefficient matrix of the frame immediately preceding the present frame for the prediction coefficient matrix of the present frame, when all of the control signal values of the accumulated signals are not less than a predetermined first threshold value;

using the prediction coefficient matrix of the present frame, when a control signal value of any of the accumulated control signals is less than the first threshold value and the control signal value in the present frame is not less than a predetermined second threshold value;

setting the value of the prediction coefficient matrix of the present frame to be a zero matrix when any of the control signal values in the accumulated control signals is less than the first threshold value and the control signal value in the present frame is less than the second threshold value; and switching from among a plurality of codevector tables used in calculating the codevector for the present frame when the control signal value in the present frame is less than the second threshold value.

5. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated codevectors and from the prediction coefficient matrix of the present frame, the prediction vector being used to predict an input vector of the present frame;

calculating the codevector of the present frame by quantizing the difference between the prediction vector and the input vector of the present frame;

calculating an output vector of the present frame by adding together the prediction vector and the codevector of the present frame;

accumulating input speech signal for frames previous to the present frame to produce accumulated input speech signals;

receiving an input speech signal of the present frame;

calculating a pitch predicted gain for the present frame from the input signal of the present frame and from the accumulated input speech signals;

accumulating control signals for frames previous to the present frame to produce accumulated control signals;

determining a control signal for the present frame from the pitch predicted gain for the present frame and the accumulated control signals, each control signal having a control signal value;

substituting a predetermined coefficient matrix of the frame immediately preceding the present frame for the prediction coefficient matrix of the present frame, when all of the control signal values of the accumulated control signals are not less than a predetermined threshold value; and using the prediction coefficient matrix of the present frame when a control signal value of any of the accumulated control signals is less than the predetermined threshold value.

6. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated codevectors and from the prediction coefficient matrix of the present frame, said prediction vector used to predict an input vector of a present frame;

calculating the codevector of the present frame by quantizing the difference between the prediction vector and the input vector of the present frame;

calculating an output vector of the present frame by adding together the prediction vector and the codevector of the present frame;

accumulating input speech signals for frames previous to the present frame to produce accumulated input speech signals;

receiving an input speech signal of the present frame;

calculating a pitch predicted gain for the present frame from the input speech signal of the present frame and from the accumulated input speech signals;

accumulating control signals for frames previous to the present frame to produce accumulated control signals;

determining a control signal for the present frame from the pitch predicted gain of the present frame and the accumulated control signals;

each control signal having a control signal value;

substituting a prediction coefficient matrix of the immediately preceding frame for the prediction coefficient matrix of the present frame, when all of the control signal values of the accumulated control signals are not less than a predetermined first threshold value;

using the prediction coefficient matrix of the present frame, when a control signal value of any of the accumulated control signals is less than the first threshold value and the control signal value in the present frame is not less than a predetermined second threshold value;

setting the value of the prediction coefficient matrix of the present frame to be a zero matrix when any of the control signal values in the accumulated control signals is less than the first threshold value and the control signal value in the present frame is less than the second threshold value; and switching from among a plurality of codevector tables used in calculating the codevector for the present frame when the control signal value in the present frame is less than the second threshold value.

7. A method for coding an input vector of a present frame using LSP prediction coding, the method comprising the acts of:

accumulating output vectors for frames previous to the present frame to produce accumulated output vectors, each output vector being produced by quantizing the difference between a prediction vector and a codevector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated output vectors and from the prediction coefficient matrix of the present frame, the prediction vector being used to predict the input vector of the present frame;

calculating the codevector of the present frame by quantizing the difference between the prediction vector and the input vector of the present frame; and calculating an output vector of the present frame by adding together the prediction vector and the codevector of the present frame.

8. A method for coding an input vector of a present frame using LSP prediction coding, the method comprising the acts of:

accumulating codevectors for frames previous to the present frame to produce accumulated codevectors, each codevector being produced by quantizing the difference between a prediction vector and the codevector for a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated output vectors and from the calculated prediction coefficient matrix of the present frame, the prediction vector being used to predict the input vector of the present frame;

calculating the codevector of the present frame by quantizing the difference between the prediction vector and the input vector of the present frame;

calculating an output vector of the present frame by adding together the prediction vector and the codevector of the present frame;

accumulating input speech signals for frames previous to the present frame to produce accumulated input speech signals;

receiving an input speech signal of the present frames; calculating a pitch predicted gain for the present frame from the input speech signal of the present frame and from the accumulated input speech signals; and determining a control signal for the present frame from the pitch predicted gain of the present frame.

9. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated output vectors and from the prediction coefficient matrix of the present frame, the prediction vector being used to predict the input vector of the present frame;

calculating the codevector of the present frame by quantizing the difference between the prediction vector and the input vector of the present frame;

calculating an output vector of the present frame by adding together the prediction vector and the codevector of the present frame;

accumulating input speech signals from frames previous to the present frame to produce accumulated input speech signals;

receiving an input speech signal of the present frame;

calculating a pitch predicted gain for the present frame from the input speech signal of the present frame and from the accumulated input speech signals;

accumulating control signals for frames previous to the present frame to produce accumulated control signals, the control signals being determined from the pitch predicted gain of a respective frame, each control signal having a control signal value;

determining a control signal for the present frame from the pitch predicted gain of the present frame and the accumulated control signals;

substituting a prediction coefficient matrix of the frame immediately preceding the present frame for the prediction coefficient matrix of the present frame when all of the control signal values of the accumulated control signals, are not less than a predetermined threshold value.

10. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated output vectors and from the prediction coefficient matrix of the present frame;

calculating the codevector of the present frame by quantizing the difference between the prediction vector and the input vector of the present frame;

calculating an output vector of the present frame by adding together the prediction vector and the codevector of the present frame, the prediction vector being used to predict an input vector of the present frame;

accumulating input speech signals for frames previous to the present frame to produce accumulated input speech signals;

receiving an input speech signal of the present frame;

calculating a pitch predicted gain for the present frame from the input speech signal of the present frame and the accumulated input speech signals;

accumulating control signals for frames previous to the present frame to produce accumulated control signals, the control signals being determined from the pitch predicted gain of a respective frame;

determining a control signal for the present frame from the pitch predicted gain of the present frame and the accumulated control signals;

each control signal having a control signal value;

substituting a prediction coefficient matrix of the frame immediately preceding the present frame for the prediction coefficient matrix of the present frame, when all of the control signal values of the accumulated signals are not less than a predetermined first threshold value;

using the prediction coefficient matrix of the present frame, when a control signal value of any of the accumulated control signals is less than the first threshold value and the control signal value in the present frame is not less than a predetermined second threshold value;

setting the value of the prediction coefficient matrix of the present frame to be a zero matrix when any of the control signal values in the accumulated control signals is less than the first threshold value and the control signal value in the present frame is less than the second threshold value; and switching from among a plurality of codevector tables used in calculating the codevector for the present frame when the control signal value in the present frame is less than the second threshold value.

11. A method for coding an input vector of a present frame using LSP prediction coding, the method comprising the acts of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors, each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated output vectors and from the prediction coefficient matrix of the present frame, the prediction vector being used to predict an input vector of the present frame;

calculating the codevector of the present frame by quantizing the difference between the prediction vector and the input vector of the present frame;

calculating an output vector of the present frame by adding together the prediction vector and the codevector of the present frame;

accumulating input speech signal for frames previous to the present frame to produce accumulated input speech signals;

receiving an input speech signal of the present frame;

calculating a pitch predicted gain for the present frame from the input signal of the present frame and from the accumulated input speech signals;

accumulating control signals for frames previous to the present frame to produce accumulated control signals;

determining a control signal for the present frame from the pitch predicted gain for the present frame and the accumulated control signals, each control signal having a control signal value;

substituting, a predetermined coefficient matrix of the frame immediately preceding the present frame for the prediction coefficient matrix of the present frame, when all of the control signal values of the accumulated signals are not less than a predetermined threshold value; and using the prediction coefficient matrix of the present frame when a control signal value of any of the accumulated control signals is less than the predetermined threshold value.

12. A method for coding an input vector of a present frame using LSP prediction coding, the method comprising the of:

accumulating codevectors for frames previous to the present frame to produce accumulated codevectors, each codevector being produced by quantizing the difference between a prediction vector and an input vector of a respective frame;

accumulating output vectors for frames previous to the present frame to produce accumulated output vectors each output vector being produced by adding the prediction vector and the codevector of a respective frame;

calculating a prediction coefficient matrix for the present frame from the accumulated codevectors and the accumulated output vectors;

calculating the prediction vector for the present frame from the accumulated output vectors and from the prediction coefficient matrix of the present frame, said prediction vector used to predict an input vector of a present frame;

calculating the codevector of the present frame by quantizing the difference between the prediction vector and the input vector of the present frame;

calculating an output vector of the present frame by adding together the prediction vector and the codevector of the present frame;

accumulating input speech signals for frames previous to the present frame to produce accumulated input speech signals;

receiving an input speech signal of the present frame;

calculating a pitch predicted gain for the present frame from the input speech signal of the present frame and from the accumulated input speech signals;

accumulating control signals for frames previous to the present frame to produce accumulated control signals;

determining a control signal for the present frame from the pitch predicted gain of the present frame and the accumulated control signals;

each control signal having a control signal value;

substituting a prediction coefficient matrix of the immediately preceding frame for the prediction coefficient matrix of the present frame, when all of the control signal values of the accumulated signals are not less than a predetermined first threshold value;

using the prediction coefficient matrix of the present frame, when a control signal value of any of the accumulated control signals is less than the first threshold value and the control signal value in the present frame is not less than a predetermined second threshold value;

setting the value of the prediction coefficient matrix of the present frame to be a zero matrix when any of the control signal values in said plurality of continuous frames are the accumulated control signals is less than the first threshold value and the control signal value in the present frame is less than the second threshold value; and switching from among a plurality of codevector tables used in calculating the codevector for the present frame when the control signal value in the present frame is less than the second threshold value.

13. An LSP prediction coding apparatus for coding an input vector of a present frame, said coding apparatus comprising:

a first memory which stores codevectors for frames previous to the present frame to produce accumulated codevectors, each codevector being produced by quantizing the difference between a prediction vector and an input vector of a respective frame;

a second memory which stores output vectors for frames previous to the present frame to produce accumulated output vectors, each output vector being produced by adding the prediction vector and the codevector of a respective frame;

a prediction coefficient calculator which calculates a prediction coefficient matrix for the present frame from the accumulated codevectors and the accumulated output vectors;

a predictor which calculates a predicted vector for the present frame from the accumulated codevectors and from the prediction coefficient matrix of the present frame;

a quantizer which produces the codevector for the present frame by quantizing the difference between the predicted vector and the input vector of the present frame; and an adder which adds together the prediction vector and the codevector of the present frame to produce an output vector of the present frame.

14. An LSP prediction coding apparatus for coding an input vector of a present frame, said coding apparatus comprising:

a first memory which stores codevectors for frames previous to the present frame to produce accumulated codevectors each codevector being produced by quantizing the difference between a prediction vector and an input vector of a respective frame;

a second memory which stores output vectors for frames previous to the present frame to produce accumulated output vectors each output vector being produced by adding the prediction vector and the codevector of a respective frame;

a prediction coefficient calculator which calculates a prediction coefficient matrix for the present frame from the accumulated codevectors and the accumulated output vectors;

a predictor which calculates a predicted vector for the present frame from the accumulated codevectors and from the prediction coefficient matrix of the present frame;

a third memory which stores input speech signals for frames previous to the present frame to produce accumulated speech signals;

a quantizer which produces the codevector for the present frame by quantizing the difference between the predicted vector and an input vector of the present frame;

a processor which calculates a pitch predicted gain from an input speech signal of the present frame and from the accumulated input speech signals, the processor further determines a control signal from the pitch predicted gain;

an integration interval determiner which determines an integration interval from the control signal; and an adder which adds together the prediction vector and the codevector of the present frame to produce an output vector of the present frame;

wherein the quantizer switches among a plurality of codevector tables used in calculating the codevector for the present frame when the control signal is less than a threshold value.

15. An LSP prediction coding apparatus for coding an input vector of a present frame, said coding apparatus comprising:

a first memory which stores codevectors for frames previous to the present frame to produce accumulated codevectors, each codevector being produced by quantizing the difference between a prediction vector and an input vector of a respective frame;

a second memory which stores output vectors for frames previous to the present frame to produce accumulated output vectors each output vector being produced by adding the prediction vector and the codevector of a respective frame;

a prediction coefficient calculator which calculates a prediction coefficient matrix for the present frame from the accumulated codevectors and the accumulated output vectors;

a predictor which calculates a predicted vector for the present frame from the accumulated codevectors and from the prediction coefficient matrix of the present frame;

a quantizer which produces the codevector for the present frame by quantizing the difference between the predicted vector and an input vector of the present frame;

a third memory which stores input speech signals for frames previous to the present frame to produce accumulated speech signals;

a processor which calculates a pitch predicted gain for the present frame from an input speech signal of the present frame and from the accumulated speech signals;

a fourth memory which stores control signals for frames previous to the present frame to produce accumulated control signals, the control signals being determined from the pitch predicted gain of a respective frame;

the processor further determines a control signal for the present frame from the pitch predicted gain of the present frame and from the accumulated control signals;

each control signal having a control signal value; and an adder which adds together the prediction vector and the codevector of the present frame to produce an output vector of the present frame; wherein the coefficient matrix calculator uses the prediction coefficient matrix of the present frame when any one of the accumulated control signal values is less than a predetermined threshold value, and wherein the coefficient matrix calculator substitutes a prediction coefficient matrix of a frame immediately preceding the present frame for the prediction coefficient matrix of the present frame when all of the control signal values of the accumulated control signals are not less than the threshold value.

16. The LSP prediction coding apparatus according to claim 15, further comprising:

an integration interval determiner which determines an integration interval from the control signal of the present frame; and wherein the accumulated codevectors and output vectors are determined by the integration interval.

17. An LSP prediction coding apparatus for coding an input vector of a present frame, said coding apparatus comprising:

a first memory which stores codevectors for frames previous to the present frame to produce accumulated codevectors, each codevector being produced by quantizing the difference between a prediction vector and an input vector of a respective frame;

a second memory which stores output vectors for frames previous to the present frame to produce accumulated output vectors, each output vector being produced by adding the prediction vector and the codevector of a respective frame;

a prediction coefficient calculator which calculates a prediction coefficient matrix for the present frame from the accumulated codevectors and the accumulated output vectors;

a predictor which calculates a predicted vector for the present frame from the accumulated codevectors and from the prediction coefficient matrix of the present frame;

a third memory which stores input speech signals for frames previous to the present frame to produce accumulated speech signals;

a quantizer which produces the codevector for the present frame by quantizing the difference between the predicted vector and an input vector of the present frame;

a processor which calculates a pitch predicted gain for the present frame from an input speech signal of the present frame and from the accumulated input speech signals;

a fourth memory which stores control signals for frames previous to the present frame to produce accumulated control signals, the control signals being determined from the pitch predicted gain of a respective frame;

the processor further determines a control signal for the present frame from the pitch predicted gain of the present frame and from the accumulated control signals;

each control signal having a control signal value; and an adder which adds together the prediction vector and the codevector of the present frame to produce an output vector of the present frame; wherein the coefficient matrix calculator uses the prediction coefficient matrix of the present frame when any one of the accumulated control signal values is less than a predetermined first threshold value and the control signal value in the present frame is not less than a predetermined second threshold value, wherein the coefficient matrix calculator substitutes a prediction coefficient matrix of a frame immediately preceding the present frame for the prediction coefficient matrix of the present frame when all of the accumulated control signal values are not less than the first threshold value and wherein the coefficient matrix calculator sets the value of the prediction coefficient matrix to be a zero matrix when any of the control signal values of the accumulated signals is is less than the first threshold value and the control signal value in the present frame is less than the second threshold value; and wherein the quantizer switches among a plurality of codevector tables when the control signal valve in the present frame is less than the second threshold value.

18. The LSP prediction coding apparatus according to claim 17, further comprising:

an integration interval determiner which determines an integration interval from the control signal of the present frame; and wherein the accumulated codevectors and output vectors are determined by the integration interval.

* * * * *